United States Patent [19]

Maddalozzo

[11] 3,741,342

[45] June 26, 1973

[54] ENGINE OIL COOLING AND FILTERING METHOD AND APPARATUS

[75] Inventor: Raymond J. Maddalozzo, Chicago, Ill.

[73] Assignee: International Harvester Company, Chicago, Ill.

[22] Filed: Nov. 8, 1971

[21] Appl. No.: 196,710

[52] U.S. Cl. .............. 184/6.4, 123/196 A, 184/6.24
[51] Int. Cl. ........................ F16n 39/06, F01m 5/00
[58] Field of Search ...................... 210/184; 184/6.4, 184/6.22, 6.24; 123/196 A, 196 S

[56] References Cited
UNITED STATES PATENTS

| | | | |
|---|---|---|---|
| 2,919,767 | 1/1960 | Haas | 184/6.24 |
| 3,090,365 | 5/1963 | Constantine | 184/6.22 X |
| 3,400,785 | 9/1968 | Allen | 184/6.24 |

*Primary Examiner*—Manuel A. Antonakas
*Attorney*—Floyd B. Harman

[57] ABSTRACT

Forced engine lubrication system with cooler, filter, pressure regulated shunt around the filter, and a bypass back to the inlet side of or to the fluid source to, an oil pump supplying the system, the system novelly operated by a bypass valve responsive to pressure in the oil gallery of an engine. The bypass is connected to a region of the system between the cooler and the filter so that all the lubricant is cooled, and the bypassed portion of the lubricant does not go through the filter.

3 Claims, 5 Drawing Figures

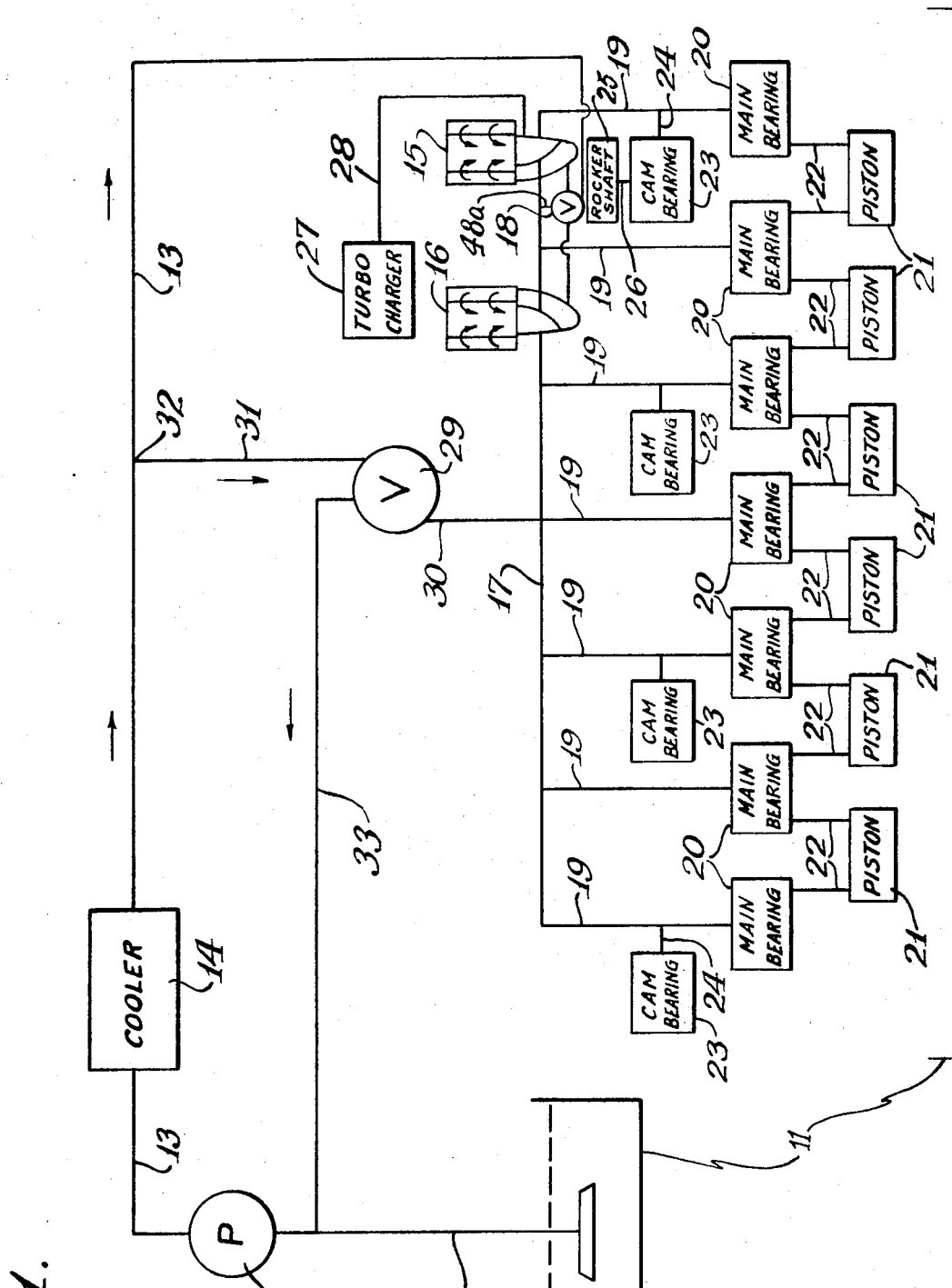

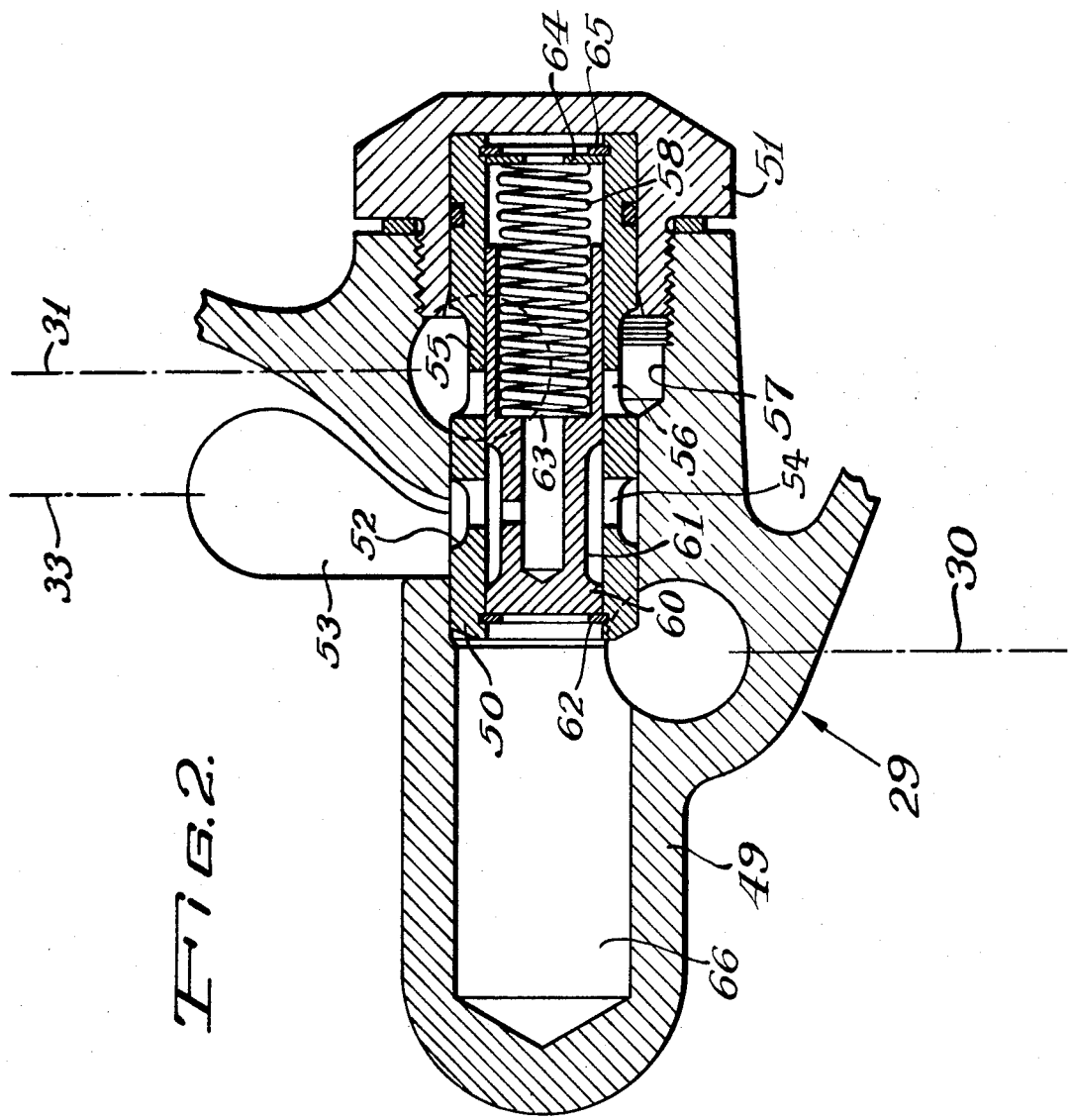

PATENTED JUN 26 1973
3,741,342
SHEET 3 OF 3
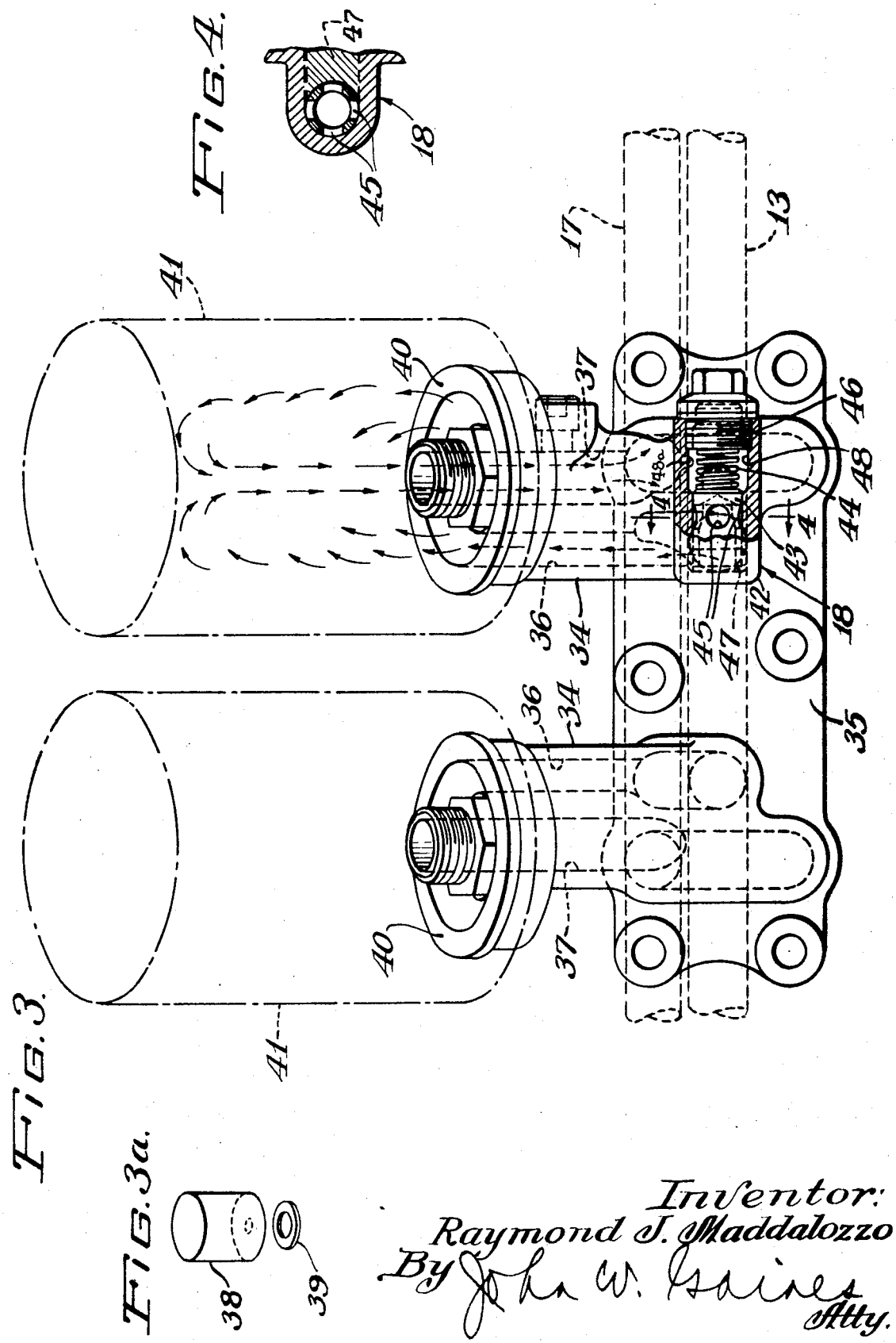
Inventor:
Raymond J. Maddalozzo
By John W. Gaines
Atty.

ENGINE OIL COOLING AND FILTERING METHOD AND APPARATUS

The present invention relates to a forced lubrication system primarily adapted for use in engines. More particularly the invention relates to the application of a bypass to such a lubrication system, particularly in relation to a cooler and filter of the system.

It is known to provide at the inlet or clean oil section of an oil gallery for an engine, a dual bypass back to the inlet side of the pump or to the sump, which bypass is controlled by a valve regulated by pressure at the inlet side of the oil gallery. So all oil leaving the pump is filtered or filtered and cooled. But that portion of clean oil bypassed at the gallery before it ever enters the gallery represents engine horsepower wasted at the pump; to force such oil through the filter against filter resistance steadily consumes horsepower which would be otherwise useable. The filters naturally become dirtier during service and aggravate the existing difficulty by consuming even more pump horsepower. They do so due to higher and higher filter resistance resulting from increased filter dirtiness, and the filters eventually clog if left unchanged.

The case is also known to provide a pressure regulating valve on a pump supplying a lubricant system. In that case, the difficulty of wasted horsepower in the filters is overcome. But the filters still pose a difficulty because of filter resistance and the consequent pressure loss therein. Gallery pressure necessarily reduces as the filters become dirty, and so gallery pressure is not precisely regulated because regulation is done at the wrong place, upstream of both the filters and the oil gallery.

A threefold objective in bypassing according to the present invention is to:
 maintain uniform oil gallery pressure without filtering all feed line oil;
 filter as far as possible all oil gallery oil without filtering all feed line oil; and cool all feed line oil, without filtering all feed line oil.

The advantages are, when the engine is cold, that the bulk of the cold and stiff oil being bypassed is bypassed ahead of the filter and, when the engine is hot, all oil flowing in the circuit is cooled including both the flow to the gallery and the flow directly bypassing to drain.

The present invention materially reduces or substantially eliminates the described difficulty of processing an extra quantity of lubricant in the filter. According to the invention, a pressure-regulated bypass leads to a sump from a region between a cooler and a filter, the bypass being controlled by a valve responsive to pressure at the clean section or inlet of the gallery to an engine. The valve thus inherently causes the bypass flow to diminish when gallery pressure falls, so as to maintain adequate clean oil flow to the engine at all times. An additional valve, specifically, a pressure relief valve, is connected across the filter for internally bypassing same when the pressure drop across the filter becomes excessive, e.g., upon start up of a cold engine. As indicated, the filter is saved from having to pass the bypassed portion of the lubricant, whereas all the lubricant passes through the cooler, thus achieving maximum cooler efficiency and good temperature control.

In the specific description that follows, features, objects, and advantages will either be specifically pointed out or become apparent.

In the drawings:
FIG. 1 is a schematic view of the lubrication system of the present invention;
FIG. 2 is a fragmentary sectional view showing the regulating valve for the bypass line;
FIG. 3 is a fragmentary elevational view showing a pair of filters employed in the present lubrication system;
FIG. 3a shows filter details, isometrically; and
FIG. 4 is a sectional view of a valve employed in a shunt around one of the filters.

As shown in FIG. 1, an engine oil sump and a pump intake line 10 leading therefrom form part of the oil source 11 from which an oil pump 12 draws suction. A discharge line 13 is connected to the outlet side of the pump 12 and leads to a cooler 14. Beyond the cooler 14, the line 13 is connected to the inlet sides of two filters 15 and 16, whose outlet sides are connected to a line or gallery 17 leading to an engine whose parts are to be lubricated. The filters 15 and 16 are connected in parallel with one another across the lines 13 and 17, and a valve 18 is also connected, through a port 48a, across lines 13 and 17, which valve serves as a shunt or bypass of the filters 15 and 16.

From the gallery 17 a plurality of lines 19 lead to a plurality of main bearings 20, each line 19 to one bearing 20. The main bearings 20, which may be seven in number, are for the crankshaft of an engine having a plurality of pistons 21, for example six pistons. Lines 22 are shown as connecting the pistons with the main bearings 20, each piston 21 being connected to two lines 22 coming from two adjacent main bearings 20. The lines 22 represent lubricant streams flowing from the main bearings 20 and directed as jets against the pistons 22 for cooling. Cam bearings 23, which may be four in number, receive lubricant through four lines 24 connected to four lines 19. A rocker shaft 25 receives lubricant through a line 26 connected to one of the cam bearings 24. A turbocharger 27 receives lubricant through a line 28 connected to the discharge side of the filter 15.

A valve 29 is sensitive to pressure in the gallery or line 17 by virtue of a line 30 connecting the valve and gallery. A line 31 connects a point 32 on the line 13 between the cooler 14 and the filters 15 and 16 with the valve 29. A line 33 connects the inlet line 10 to the pump 12 with the valve 29. When the pressure in the gallery or line 17 exceeds a certain amount, this pressure is sensed in the valve 29 through the line 30, and the valve 29 is opened causing the lubricant to be bypassed through the lines 31 and 33 and the valve 29 from the point 32 between the cooler 14 and filters 15 and 16 to the intake side of the pump 12.

As shown in FIGS. 1 and 3, each of the filters 15 and 16 comprises a base 34, each base being an integral part of a casting 35 adapted to be bolted to the engine. Each base 34 has an inlet chamber 36 connected with the line 13, and an outlet chamber 37 connected with the gallery or line 17. Each of the filters 15 and 16 further comprises a throw-away hollow cylindrical cartridge 38 (FIG. 3a) which rests against a sealing washer 39 in turn resting against a flange 40 (FIG. 3) on the base 37 of the filter. Each filter cartridge 38 is held against its associated sealing washer 39 by the inside of the end of a can 41, which is secured by means not shown against the associated flange of the base 34. Lubricant to be filtered flows from the chamber 36 to the space between the can 41 and the cartridge 38, inwardly at various points along the cartridge 38 to the space therewithin, and thence out to the chamber 37.

As shown in FIGS. 3 and 4, the valve 18 includes a housing portion 42 formed integral with the casting 35. The valve 18 further comprises a plug 43 and a coil spring 44. The plug 43 is hollow and closed at one end and has a plurality of side openings 45. The plug 43 is urged to the closed position of FIG. 3 by the spring 44 which acts between the plug 43 and a closure member 46 threaded into the portion 42 of the valve 18. When the lubricant is cold and stiff, it is difficult to push it through the filter cartridges 38 (FIG. 3a) of the filters 15 and 16 (FIG. 1), and so the pressure builds up in a chamber 47 formed in the housing portion 42 in communication with the chamber 36. The result is that the valve plug 43 is pushed to the right of the position of FIG. 3 against the spring 44, causing the openings 45 to connect the chamber 47 with a chamber 48 in the housing portion 42. Chamber 48 communicates through a port 48a with the gallery line 17. Thus as a function of the pressure drop across the filters 15 and 16, resulting in a high pressure differential on opposite sides thereof, the lubricant is shunted around the filters 15 and 16.

As shown in FIG. 2, the valve 29 comprises a body 49, a sleeve 50, and a retaining member 51 threaded into the body 49 and holding the sleeve 50 against an internal shoulder in the body 49. The sleeve 50 has an external circumferential groove 52 communicating with a chamber 53 connected to the line 33. A plurality of side openings 54 connect the groove 52 with the interior of the sleeve 50. The sleeve 50 has an external circumferential groove 55 longitudinally spaced from the groove 52 and a plurality of side openings 56 leading from the groove 55 to the interior of the sleeve 50. The groove 55 is in communication with a chamber 57 in the body 49 connected to the line 31. A hollow plug 60 fits in the sleeve 50 and has a wide external peripheral groove 61 which is always in communication with the openings 54 in the sleeve 50. In the position shown in FIG. 2, one end of the plug 60 which has gallery pressure communicated thereto abuts a split ring 62 inserted in an internal groove in the sleeve 50. The plug 60 is urged to this position by means of a coil spring 63 which acts at one end against an internal shoulder in the plug 60 and at the other end against a ring 64 which abuts a split ring 65 inserted in an internal groove in the sleeve 50.

In the position of FIG. 2, the plug 60 blocks communication between the chambers 53 and 57, since the peripheral groove 61 on the plug 60 does not overlap the openings 56 and 54 in the sleeve 50. A chamber 66 in the body 49 is connected with the line 30 leading to the gallery or line 17 of the engine. The pressure in the chamber 66 acts against a pressure movable area of the plug 60 and, upon reaching a sufficiently high value, urges the plug 60 to the right of the position of FIG. 2, causing the groove 61 on the plug 60 to overlap the openings 54 and 56 in the sleeve 50. As a result of this, the chambers 53 and 57 are brought into communication, and this establishes communication between the lines 31 and 33. As a result, lubricant is bypassed from the point 32 in the line 13 through the lines 31 and 33 to the intake side of the pump 12 at line 10.

In operation of the forced lubricant system of the present invention, the lubricant while cold and stiff flows from the source 11 through the pump 12, the discharge line 13, the cooler 14, again the line 13, shunt valve 18, and the engine gallery or line 17 to the lines 19, 22, 24, and 26, thence to the main bearings 20, pistons 21, cam bearings 23, and rocker shaft 25. From these parts the lubricant is drained and returned to the source 11. When the lubricant becomes sufficiently warm and less viscous, the lubricant goes by way of the filters 15 and 16 from the line 13 to the line 17, and attendant to the resulting drop in pressure in the valve chamber 47 the valve 18 automatically closes. When a predetermined pressure of lubricant is reached in the line 17, the valve 29 is opened and lubricant is bypassed from the outlet side of the cooler through the lines 31 and 33 to the line 10 included in the source 11.

My invention thus provides for full flow cooling of engine lubricant in an appropriately pumped and drained circuit, including a first means of cooling, and leading from a downstream side of the first means to and including a filter and gallery, and operable in a manner characterized by the steps in a method of: cooling the lubricant in the first means; circulating all cooled lubricant in said line downstream thus making available a supply flow for the gallery for its requirements plus an operable bypass flow to drain; generating a pressure signal of gallery pressure as a function of the gallery supply being adequate or in excess of gallery requirements; applying the pressure signal to bypass; and operating said bypass with the applied signal in a manner to increase bypass flow with increases in gallery pressure, and vice versa.

It is most significant that the bypass line 13 is connected to the region 32 of the line 13, which is at a point between the cooler 14 and the filters 15 and 16. Thus, only that part of the lubricant going to the gallery or line 17 is passed through the filters 15 and 16, which are relieved of having to treat the portion of the lubricant passing back to the inlet side of the pump 12 by way of the lines 31 and 33. This cuts down the amount of filtering required per unit time, and so the life of the filters is increased. This is a very important item, since the service life of the replaceable filter cartridges 38 is a function of the quantity of oil filter thereby. Another important advantage in the placing of the connection 32 for the bypass lines 31 and 33 in the line 13 between the cooler 14 and the filters 15 and 16 is that all the oil being pumped flows through the cooler 14 thus attaining full efficiency of the cooler to absorb heat from the oil.

What is claimed is:

1. In an engine lubricating system:
   first means for pumping and cooling lubricant, having an intake (11) and an output (13);
   an oil filter having an inlet (13) connected in the output of the first means and having a line of delivery;
   an engine gallery (17) connected in the filter line of delivery, establishing as back pressure thereon a gallery oil pressure;
   a relief valve (18) connected across the filter inlet and delivery, in communication with, and operable in response to, output pressure as a direct bypass around the oil filter; and
   a second valve (29) connected across the intake and output of the first means, in communication with, and operable in response to, gallery oil pressure as a direct bypass around the first means, whereby the oil filter will not be overworked.

2. Procedure for full flow cooling of engine lubricant in an appropriately pumped and drained circuit including a first means for cooling, and leading from the downstream side of the first means in a line downstream and including second filter-and-gallery means, said procedure characterized by the methodic steps of:
   cooling the lubricant in the first means and circulating all cooled lubricant in said line downstream;
   supplying to the second means all the requirements thereof for cooled lubricant in the gallery;
   bypassing to drain the excess of cooled lubricant above gallery requirements with the increases of bypass flow being in response to increases of the gallery pressure, thus avoiding filtering overwork; and
   automatically internally relieving pressure build-up across the filtering in the second means, by relief means, thus further avoiding filtering.

3. Procedure for the full flow cooling of engine lubricant in an appropriately pumped and drained circuit, including a first means of cooling, said circuit leading from a downstream side of the first means in a line downstream and including a filter and gallery, said procedure characterized by the methodic steps of:
   cooling the lubricant in the first means;
   circulating all cooled lubricant in said line downstream thus making available a supply flow for the gallery for its requirements plus an operable bypass flow to drain;
   generating a pressure signal of gallery pressure as a function of the gallery supply being adequate or in excess to gallery requirements;
   applying said pressure signal to bypass;
   operating said bypass with the applied signal in a manner to increase bypass flow with increases in gallery pressure, and vice versa, thus avoiding filtering overwork during such increases; and
   automatically internally relieving pressure build-up across the filtering in said filter, by relief means, thus avoiding the additional filtering during such build-up.

* * * * *